(12) United States Patent
Niedermeier

(10) Patent No.: US 6,189,981 B1
(45) Date of Patent: Feb. 20, 2001

(54) BRAKE SYSTEM FOR A MOTOR VEHICLE

(75) Inventor: Ernst Niedermeier, Neutraubling (DE)

(73) Assignee: Siemens Aktiengesellschaft, Munich (DE)

(*) Notice: Under 35 U.S.C. 154(b), the term of this patent shall be extended for 0 days.

(21) Appl. No.: 09/250,870

(22) Filed: Feb. 16, 1999

(30) Foreign Application Priority Data

Feb. 16, 1998 (DE) .............................................. 198 06 285

(51) Int. Cl.[7] .................................................. B60T 13/66
(52) U.S. Cl. ...................... 303/20; 303/152; 303/DIG. 9; 303/122.04
(58) Field of Search .................................. 303/3, 15, 20, 303/152, DIG. 9, 9, 122.04, 122.05

(56) References Cited

U.S. PATENT DOCUMENTS

| | | | |
|---|---|---|---|
| 4,345,796 | * | 8/1982 | Reineckt ........................ 303/DIG. 9 |
| 5,335,979 | * | 8/1994 | Natou et al. ................... 303/DIG. 9 |
| 5,372,410 | * | 12/1994 | Miller et al. ........................... 303/20 |
| 6,030,054 | * | 2/2000 | Doericht ................................. 303/20 |

FOREIGN PATENT DOCUMENTS

| | | |
|---|---|---|
| 3504096A1 | 8/1986 | (DE) . |
| 19521175C1 | 7/1996 | (DE) . |
| 19615186C1 | 8/1997 | (DE) . |

* cited by examiner

*Primary Examiner*—Matthew Graham
(74) *Attorney, Agent, or Firm*—Herbert L. Lerner; Laurence A. Greenberg; Werner H. Stemer

(57) ABSTRACT

A brake system for a motor vehicle includes a pedal unit through which activations of a brake pedal are sensed, two central units and electromechanical brake actuators assigned to wheels. Sensor signals are transmitted to the central units by the pedal unit. In the central units, brake engagement setpoint values are calculated and serially encoded together with the sensor signals, and control signals for supplementary brake functions are generated. The encoded signals are each transmitted to two respective brake actuators through data buses. The control units of the brake actuators make a majority decision and control the brake actuators accordingly.

6 Claims, 1 Drawing Sheet

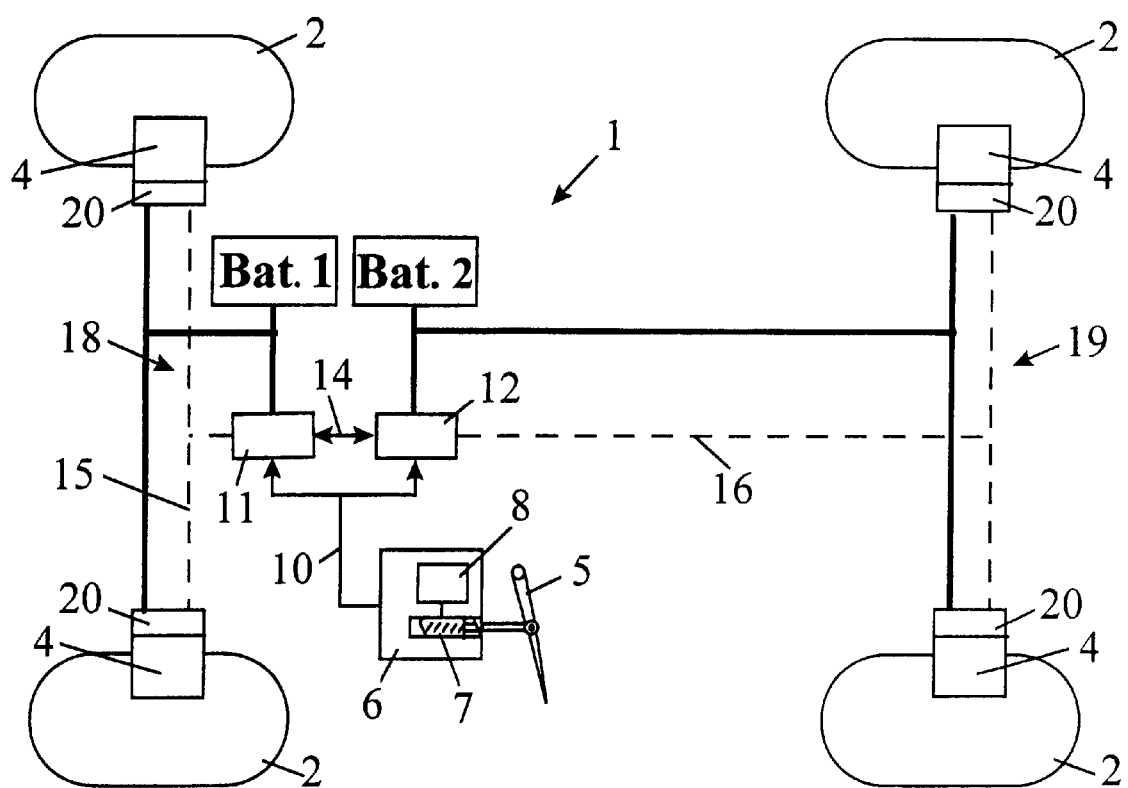

BRAKE SYSTEM FOR A MOTOR VEHICLE

BACKGROUND OF THE INVENTION

Field of the Invention

The invention relates to a brake system for a motor vehicle having electromechanical brake actuators assigned to wheels.

Nowadays, passenger cars are almost always provided with hydraulic brake systems. The increasing demands which are made of additional brake functions, such as anti-lock brake functions, driving stability systems and traction control systems, as well as requirements for reduction in the installation and maintenance costs and a decrease in the hydraulic devices, have led to the development of electromechanical brake systems.

In such brake systems, the driver is disconnected from the brake in terms of force, that is to say the braking torque request which emanates from the driver is not transferred directly as a force through a hydraulic system but rather only as a signal through an electrical lead. That signal is used to control an electric brake actuator which generates a force at a brake with an electric power supply and that force brings about the desired braking torque through the use of a friction element. In the case of a disk brake, the force which generates the braking torque is referred to as a brake engagement force.

In an electromechanical brake system, such as is described, for example, in German Patent DE 196 15 186 C1, corresponding to U.S. application Ser. No. 08/843,887, filed Apr. 17, 1997, the brake actuator is mounted directly on the respective wheel of the motor vehicle so that a brake engagement force is expediently not transmitted over large distances in the vehicle. The braking torque request and the brake controller are disposed at a central point, for example in the vicinity of the brake pedal. The brake system is thus distributed over the entire vehicle, and since it forms a central safety function of the vehicle, increased safety demands are made of the electrical transmission of the braking torque requests.

The braking torque request is usually tapped from the brake pedal through the use of force sensors and displacement sensors. However, such sensors have non-detectable fault states so that a number of them, for example three, are disposed in a redundant way. Therefore, even when a sensor fails, the braking torque request can still be reliably detected, for example through the use of a 2 out of 3 majority decision.

Brake systems which distribute all of the sensor signals to the brake actuators have been known to date. The majority decision is then taken in a decentralized manner in the control unit of the respective brake actuator, as in German Patent DE 195 21 175 C1. That provides a high degree of safety, but the expenditure involved, especially on the cabling in the vehicle, is considerable.

SUMMARY OF THE INVENTION

It is accordingly an object of the invention to provide a brake system for a motor vehicle, which overcomes the hereinafore-mentioned disadvantages of the heretofore-known devices of this general type and which is fault-tolerant, in particular with regard to the transmission of the braking torque requests.

With the foregoing and other objects in view there is provided, in accordance with the invention, a brake system in a motor vehicle, comprising a brake pedal; a pedal unit having at least two sensors for sensing activations of the brake pedal and supplying sensor signals; at least two parallel central units for calculating setpoint values for a brake activation force from the sensor signals and for converting the setpoint values together with unprocessed sensor signals, into a serially encoded signal; a multi-channel signal line connecting the pedal unit and the central units to one another for transmitting the sensor signals; electromechanical brake actuators assigned to the wheels; decentralized control units associated with the brake actuators for comparing the setpoint values during fault-free operation, for comparing the sensor signals in the event of a fault and for generating control signals on the basis of the setpoint values and sensor signals; and two data buses each respectively connecting one of the central units and two of the brake actuators to one another for serially transmitting the encoded signals.

In accordance with another feature of the invention, the central units generate control signals for supplementary braking functions.

In accordance with a further feature of the invention, the two central units exchange and compare signals permitting mutual monitoring.

In accordance with an added feature of the invention, the central units expand the encoded signal with redundant supplementary information permitting the control units associated with the brake actuators to detect transmission faults.

In accordance with an additional feature of the invention, the sensor signals and existing information paths are used to activate the system during a pause in operation.

In accordance with a concomitant feature of the invention, the pedal unit has at least three of the sensors for sensing the activations of the brake pedal; and the decentralized control units compare the setpoint values in the case of fault-free operation and the sensor signals in the event of a fault, and generate control signals on the basis of the most frequently occurring corresponding values.

The advantages of the invention lie especially in the fact that the safety of the brake system is increased with little expenditure and simple measures. In addition, the sensor signals can be used to activate the system during a pause in operation, that is to say when the engine is at a standstill.

Other features which are considered as characteristic for the invention are set forth in the appended claims.

Although the invention is illustrated and described herein as embodied in a brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a diagrammatic view of a motor vehicle with a brake system according to the invention.

DESCRIPTION OF THE PREFERRED EMBODIMENTS

Referring now in detail to the single figure of the drawing, there is seen a diagrammatically illustrated motor vehicle that is provided with a brake system 1, which includes a brake at each of four wheels 2. The brake, for example a disk brake equipped with a brake caliper which is float-mounted, is generally known and therefore not illustrated herein. The disk brake is activated by a respective electric brake actuator 4. The driver of the motor vehicle activates the brakes by virtue of the fact that a brake pedal 5, which is connected to a pedal unit 6, outputs a braking torque request. The pedal unit 6 acts as a pedal force simulator, and is provided with a spring 7, with one or more force sensors and with at least one displacement sensor, which senses the activation of the brake pedal by the driver and converts it into electrical signals. The sensors are represented globally by a "sensor system" block 8. The sensors, which are not illustrated herein, are described in the above-mentioned patents.

The pedal unit 6 is connected to two central units 11 and 12 through the use of a multichannel, preferably three-channel, signal line 10, having one channel for each sensor signal in each case. The central units 11 and 12 each contain a microprocessor which calculates setpoint values for brake engagement forces of the brake calipers from the sensor signals. Both the setpoint values and the unprocessed sensor signals are digitized and converted into a serially encoded signal. Depending on the scope of the control functions contained in the microprocessors, the central units can change these brake engagement setpoint values depending on the driving situation. For example, in the case of an ABS system they reduce the setpoint values in such a way that the respective wheels no longer lock.

The two central units 11 and 12 which operate independently of one another can communicate with one another through a bidirectional data line 14 and can thus detect faults which occur in one of the central units, for example by comparing respective input variables and output variables. In each case, each of the two central units 11, 12 is connected to two of the brake actuators 4 through the use of a data bus 15, 16, for example a CAN bus. The data buses 15, 16 are implemented as a single-wire bus, with the result that two brake circuits 18 and 19 which each have their own power supply in the form of a battery Bat. 1 and Bat. 2 are produced. The digital setpoint values are transferred in serially encoded form to the brake actuators 4 together with the sensor signals and a possible fault message. For safety reasons, redundant information, for example a check sum, is added in order to be able to detect possible transmission faults.

Decentralized control units 20 for the individual brake actuators 4 then make a majority decision independently of one another. Here, in the case of fault-free operation, that is to say without a fault report, the digitized brake engagement setpoint values are compared for correspondence, and a control signal for the respective brake actuator 4 is then generated on the basis of the most frequently occurring setpoint value. On the other hand, in the event of a fault, the control signals are generated on the basis of the most frequently occurring unprocessed sensor signals. As a result, a minimum function of the brake system is ensured, without supplementary functions such as ABS, traction control or driving stability control, for example, even when there are faults in the central units. The brake actuator can produce the brake engagement force at the brake caliper in different ways, for example through the use of a mechanical or a hydraulic transmission.

If, for reasons of costs or space, just two sensors are used for sensing activations of the brake pedal by the driver, it is known from German Published, non-Prosecuted Patent Application DE 35 04 096 A1 to detect failures in one of the two sensors by checking plausibility criteria.

In the figure, supply leads are shown by thick lines, signal and data leads are shown by thin lines and provided with arrows corresponding to the direction of flow of the signals, and data buses are indicated by broken lines.

The advantage of the brake system described above is thus that fault tolerance is significantly increased by the decentralized majority decision in the control units 20 of the brake actuators 4 without at the same time having to considerably increase expenditure, especially on cabling. Multichannel signal leads are necessary only between the pedal unit and the two central units which are disposed preferably in the vicinity of the pedal. In those central units, the sensor signals are converted into serially encoded signals which can then be transmitted to the control units for the brake actuators through a single data bus. The control units can detect possible transmission faults by adding redundant supplementary information, such as information relating to a checksum, for example. However, in particular, the sensor signals and existing information paths can be used for activating the system during a pause in operation, so that the effectiveness of the brake system is ensured even when the engine is at a standstill.

I claim:

1. In a motor vehicle having wheels, a brake system comprising:

a brake pedal;

a pedal unit having at least two sensors for sensing activations of said brake pedal and supplying sensor signals;

at least two parallel central units for calculating setpoint values for a brake activation force from the sensor signals and for converting the setpoint values together with unprocessed sensor signals, into a serially encoded signal;

a multi-channel signal line connecting said pedal unit and said central units to one another for transmitting the sensor signals;

electromechanical brake actuators assigned to the wheels;

decentralized control units associated with said brake actuators for comparing the setpoint values during fault-free operation, for comparing the sensor signals in the event of a fault and for generating control signals on the basis of the setpoint values and sensor signals; and two data buses each respectively connecting one of said central units and two of said brake actuators to one another for serially transmitting the encoded signals.

2. The brake system according to claim 1, wherein said central units generate control signals for supplementary braking functions.

3. The brake system according to claim 1, wherein said two central units exchange and compare signals permitting mutual monitoring.

4. The brake system according to claim 1, wherein said central units expand the encoded signal with redundant supplementary information permitting said control units associated with said brake actuators to detect transmission faults.

5. The brake system according to claim 1, wherein the sensor signals and existing information paths are used to activate the system during a pause in operation.

6. The brake system according to claim 1, wherein:

said pedal unit has at least three of said sensors for sensing the activations of said brake pedal; and said decentralized control units compare the setpoint values in the case of fault-free operation and the sensor signals in the event of a fault, and generate control signals on the basis of the most frequently occurring corresponding values.

* * * * *